UNITED STATES PATENT OFFICE.

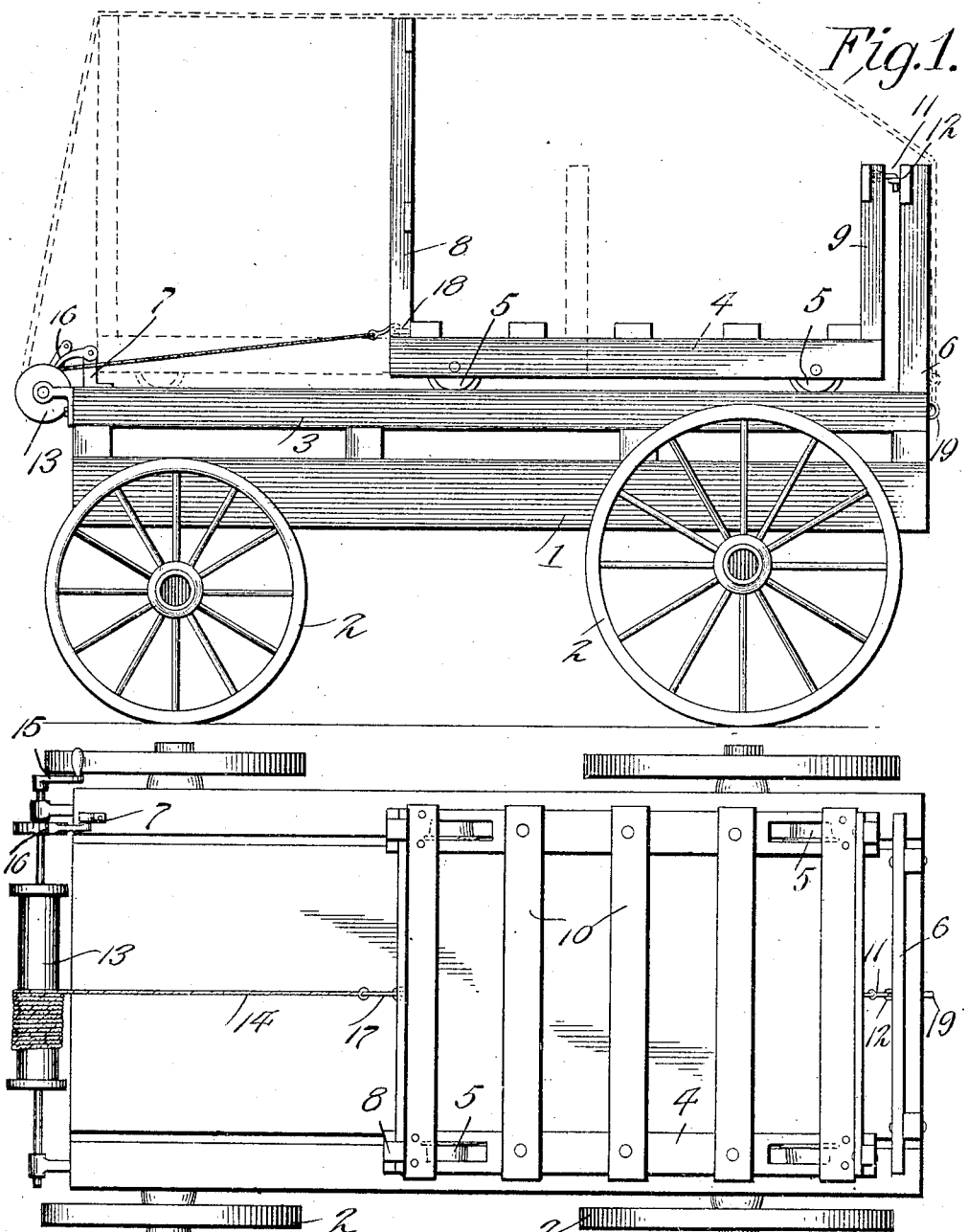

EDWARD H. MOYER, OF ROCKFORD, OHIO, ASSIGNOR OF ONE-HALF TO JOHN MOYER, OF VAN WERT, OHIO.

HAY-RACK.

No. 882,407.   Specification of Letters Patent.   Patented March 17, 1908.

Application filed October 12, 1907. Serial No. 397,143.

*To all whom it may concern:*

Be it known that I, EDWARD H. MOYER, a citizen of the United States, residing at Rockford, in the county of Mercer and State of Ohio, have invented new and useful Improvements in Hay-Racks, of which the following is a specification.

This invention relates to hay racks, the object of the invention being to provide in connection with a suitable wagon body, a truck movable lengthwise of the wagon body, in combination with means for moving the truck and also binding the load of hay or straw on the truck and wagon body, whereby a wagon may be readily and completely loaded with hay or straw by a single operator.

With the above and other objects in view, the invention consists in the novel construction, combination and arrangement of parts hereinafter fully described, illustrated and claimed.

In the accompanying drawings, Figure 1 is a side elevation of a wagon showing the truck and improved mechanism applied thereto. Fig. 2 is a plan view of the same.

Referring to the drawings, 1 designates a wagon body supported by the usual carrying wheels 2. Supported at a suitable elevation above the wagon body proper on rails or tracks 3 which extend the entire length of the wagon body and form supports for a superimposed truck embodying a bottom frame 4 and carrying wheels 5 which are flanged to engage the track rails 3 so that the truck may be moved lengthwise of the wagon body.

At one end the wagon body is provided with standards or an upright frame 6 while at the opposite end of the rails 3 is a stop 7 which limits the movement of the truck 4 in the opposite direction. The truck itself is provided with end uprights 8 and 9 between which the hay or straw is confined as it is loaded upon the truck, and the bottom frame of the truck is also provided with suitable cross slats 10 to form a sufficient support for the hay or straw when placed thereon. One of the end uprights or frames 9 of the truck is provided with a suitable fastener 11 which may conveniently consist of a hook adapted to engage an eye or keeper 12 on the corresponding end frame 6 of the wagon body so as to hold the truck in a position shown in Fig. 1 when starting to place the load of hay upon the wagon.

After the truck 4 is completely loaded, it is drawn to the opposite end of the wagon body by mechanism embodying a windlass 13 and rope or cable 14 wound thereon, an operating handle or lever 15 and pawl and ratchet holding mechanism 16. The rope or cable 14 is provided with a terminal hook 17 which is adapted to be detachably connected to an eye 18 on the truck 4 and also to be detachably connected to an eye 19 on the wagon body in the manner indicated in dotted lines in Fig. 1.

After the truck 4 has been drawn to the opposite end of the wagon body as indicated by dotted lines in Fig. 1, the rope or cable 14 is disconnected from the truck and then after the wagon has been completely loaded the rope or cable 14 is passed over the entire load and the hook 17 is engaged with the eye 19. The windlass is then revolved until the cable 14 is drawn tightly over the load of hay thus securely binding the load on the wagon body and thereby doing away with the usual ridge pole and fastenings therefor.

Having thus fully described the invention, what is claimed as new is:—

The combination with a wagon body having stops at the opposite ends thereof, of a wheeled truck movable lengthwise of said body, means for securing said truck to one of the stops, and means for moving the truck lengthwise of the body and also binding the load on the truck and wagon, said means consisting of a ratchet windlass, and a rope or cable for said windlass provided with a terminal fastening device detachably connected to the truck and also adapted to pass over the load lengthwise of the body and connect to the wagon body at the end opposite the windlass.

In testimony whereof I affix my signature in presence of two witnesses.

EDWARD H. MOYER.

Witnesses:
J. D. MILLER,
WM. LYNCH.